(12) United States Patent
Elad et al.

(10) Patent No.: US 12,168,412 B2
(45) Date of Patent: Dec. 17, 2024

(54) CENTRALIZED OCCUPANCY DETECTION SYSTEM

(71) Applicant: AyDeeKay LLC, Aliso Viejo, CA (US)

(72) Inventors: Danny Elad, Kibutz Matsuva (IL); Dan Corcos, Tel Aviv (IL)

(73) Assignee: AyDee Kay LLC, Aliso Viejo, CA (US)

(*) Notice: Subject to any disclaimer, the term of this patent is extended or adjusted under 35 U.S.C. 154(b) by 0 days.

(21) Appl. No.: 18/231,218

(22) Filed: Aug. 7, 2023

(65) Prior Publication Data

US 2023/0382340 A1 Nov. 30, 2023

Related U.S. Application Data

(63) Continuation of application No. 17/157,039, filed on Jan. 25, 2021, now Pat. No. 11,760,291.

(51) Int. Cl.
*B60R 21/015* (2006.01)
*G01S 13/04* (2006.01)
*G01S 13/931* (2020.01)
*G01S 13/46* (2006.01)

(52) U.S. Cl.
CPC ........ *B60R 21/01534* (2014.10); *G01S 13/04* (2013.01); *G01S 13/931* (2013.01); *G01S 2013/464* (2013.01)

(58) Field of Classification Search
CPC ...................................................... G01S 13/75
See application file for complete search history.

(56) References Cited

U.S. PATENT DOCUMENTS

| | | | | |
|---|---|---|---|---|
| 5,653,462 A | * | 8/1997 | Breed | B60R 21/01534 180/272 |
| 6,753,780 B2 | * | 6/2004 | Li | G01S 13/931 340/573.1 |
| 9,671,492 B2 | * | 6/2017 | Diewald | B60R 21/01534 |
| 11,760,291 B2 | * | 9/2023 | Elad | G01S 7/4082 701/45 |
| 2002/0029103 A1 | * | 3/2002 | Breed | B60R 21/01534 701/45 |
| 2004/0245035 A1 | * | 12/2004 | Hofbeck | G01S 13/75 180/271 |

(Continued)

FOREIGN PATENT DOCUMENTS

DE 102016213077 A1 * 1/2018 ....... B60R 21/01534

OTHER PUBLICATIONS

PCT International Search Report and Written Opinion, PCT/US2022/013544, May 4, 2022.

*Primary Examiner* — Bernarr E Gregory
(74) *Attorney, Agent, or Firm* — Steven Stupp

(57) ABSTRACT

A centralized occupancy detection system enables monitoring of multiple seats, or more generally, multiple stations, with a single sensor. One illustrative vehicle includes: one or more stations each configured to accommodate an occupant of the vehicle, a radar-reflective surface, and a radar transceiver configured to use the radar-reflective surface to detect an occupant of at least one of the stations. Another illustrative vehicle includes: multiple stations to each accommodate an occupant of the vehicle, and a radar transceiver configured to examine each of the multiple stations to determine whether that station has an occupant.

20 Claims, 4 Drawing Sheets

(56) References Cited

U.S. PATENT DOCUMENTS

| | | | |
|---|---|---|---|
| 2005/0285736 A1* | 12/2005 | Hofbeck | G01S 13/75 340/552 |
| 2006/0061470 A1* | 3/2006 | Hofbeck | B60R 21/01534 340/553 |
| 2006/0152347 A1 | 7/2006 | Hofbeck et al. | |
| 2006/0180377 A1 | 8/2006 | Hofbeck et al. | |
| 2007/0193811 A1* | 8/2007 | Breed | B60R 21/01534 180/271 |
| 2015/0129343 A1* | 5/2015 | Teng | B60R 21/01534 180/271 |
| 2016/0311388 A1 | 10/2016 | Diewald | |
| 2017/0282828 A1* | 10/2017 | Carenza | G01S 13/931 |
| 2019/0366965 A1 | 12/2019 | Ben Khadhra et al. | |
| 2020/0231111 A1 | 7/2020 | Ghannam et al. | |
| 2020/0249337 A1 | 8/2020 | Darko et al. | |

* cited by examiner

CENTRALIZED OCCUPANCY DETECTION SYSTEM

This application is a continuation of U.S. patent application Ser. No. 17/157,039, filed on Jan. 25, 2021, now U.S. Pat. No. 11,760,291.

BACKGROUND

Vehicle manufacturers employ occupancy sensors to detect which seats are occupied during operation. Such sensors enable manufacturers to offer features for enhancing passenger safety or comfort, e.g., seatbelt reminders, seatbelt pretensioning, airbag enablement, child presence reminders, accessory power timeout adjustment. In cars or other vehicles having a relatively small number of seats, each seat may be equipped with an occupancy sensor, traditionally in the form of a weight sensor. However, weight sensors often suffer from "false positive" detections when objects such as backpacks or purses are placed on the seat. Moreover, as the number of seats in a vehicle increases, manufacturers typically choose to omit the occupancy sensors, foregoing the associated benefits due to the added costs.

SUMMARY

The problems identified above may be addressed at least in part by a centralized occupancy detection system that enables monitoring of multiple seats, or more generally, multiple stations, with a single sensor. As one example, an illustrative vehicle includes: one or more stations each configured to accommodate an occupant of the vehicle, a radar-reflective surface, and a radar transceiver configured to use the radar-reflective surface to detect an occupant of at least one of the stations.

As another example, an illustrative vehicle includes: multiple stations to each accommodate an occupant of the vehicle, and a radar transceiver configured to examine each of the multiple stations to determine whether that station has an occupant.

As yet another example, an illustrative multi-station occupancy detector includes: an antenna array; a radar transceiver coupled to the antenna array to provide transmit signals and to accept receive signals; a memory having a set of azimuth-elevation-range parameter values for each of multiple stations configured to accommodate vehicle occupants; and a controller configured to adjust relative phases of the transmit signals and analyze receive signals in accordance with each set of azimuth-elevation-range parameter values to derive radar measurements indicating occupancy of each station.

Each of the foregoing examples can be employed individually or in conjunction, and may include one or more of the following features in any suitable combination: 1. the radar transceiver uses an antenna array to obtain separable occupancy measurements of the multiple stations. 2. the radar transceiver is configured to detect an occupant of a second station of the multiple stations via line of sight. 3. the radar-reflective surface is formed by a roof of the vehicle. 4. the radar-reflective surface is attached to a roof of the vehicle. 5. the radar transceiver is attached to or incorporated in a dashboard of the vehicle. 6. at least one station is in a second row of seating. 7. at least one station is in a third row of seating. 8. at least one of the azimuth-elevation-range parameter value sets corresponds to a signal transmission and reception path that reflects from a radar-reflective surface. 9. at least one of the azimuth-elevation-range parameter value sets corresponds to a direct line-of-sight signal transmission and reception path. 10. at least one of the azimuth-elevation-range parameter value sets corresponds to a station in a second row of seating.

DETAILED DESCRIPTION

It should be understood that the following description and accompanying drawings are provided for explanatory purposes, not to limit the disclosure. To the contrary, they provide the foundation for one of ordinary skill in the art to understand all modifications, equivalents, and alternatives falling within the scope of the claims.

Figure 1A:
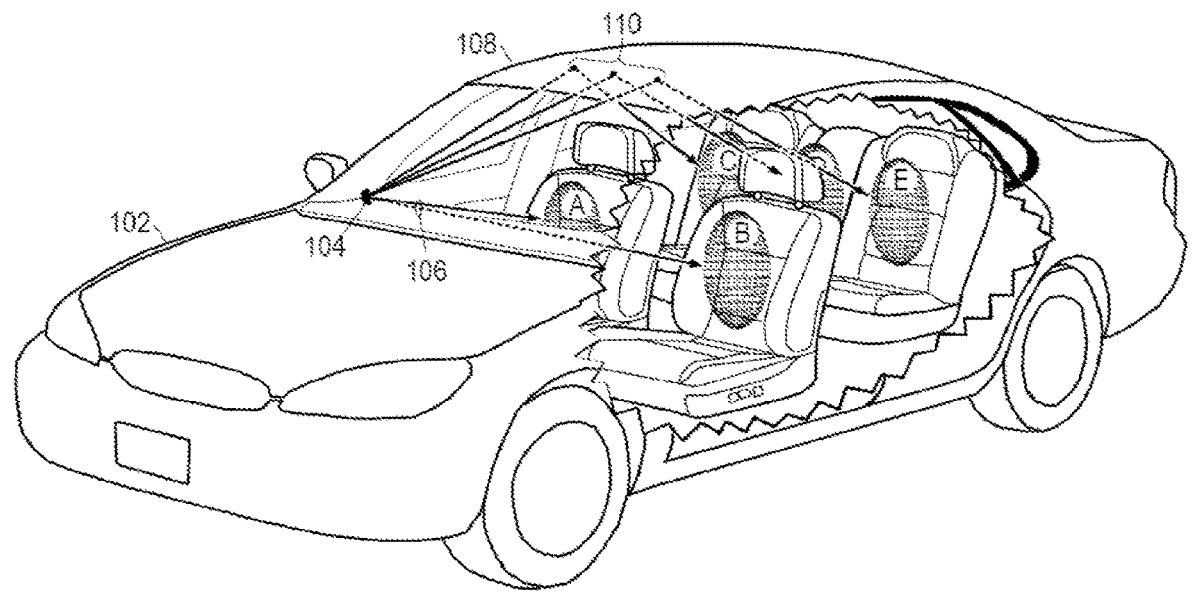
FIG. 1A is a cutaway perspective view of an illustrative vehicle cabin with a centralized occupancy detection system.

FIG. 1A shows an illustrative vehicle 102 having five stations designed to accommodate occupants, each of the stations having an associated volume (labeled A through E) that would be at least partially filled by the occupant of that station. The vehicle 102 further includes a centralized occupancy detector 104 configured to monitor the volumes associated with each of the five stations to detect whether the stations are occupied. Occupants are expected to be living beings, which generally have a large water percentage and are accordingly reflective to radar signals (at least to a higher degree than the air that would occupy the volume in the absence of an occupant).

The centralized occupancy detector 104 includes a radar transceiver and an antenna array that can direct radar signal energy to each of the multiple stations and sense reflected radar energy from each of the multiple stations. The occupancy detector 104 may drive the antenna elements in a phased fashion that steers the transmitted signal energy along a desired direction (expressible in terms of azimuth and elevation angles from the antenna array), and may further combine signals received via the antenna elements in a phased fashion that provides directional sensitivity to reflected signal energy along the desired direction. Alternatively, the occupancy detector 104 may drive the antenna elements in an independent fashion (e.g., using time division multiplexing, frequency division multiplexing, code division multiplexing), determine each element's response when a given transmission element is used, and process the measurements mathematically to provide virtual steering of the transmitted energy and directional sensitivity. In either case, the occupancy detector 104 uses the antenna array to obtain directionally separable measurements of the volumes associated with the multiple stations.

FIG. 1A shows illustrative paths along which transmitted radar signal energy may propagate from the detector 104

(shown here on or in the dashboard near the front door post on the passenger side) to each of the volumes A through E. The paths to front seat volumes A and B are direct, line-of-sight paths 106. Because the front seats obstruct a direct view of the back seat volumes C-E, the remaining paths reflect from a radar-reflective surface such as the cabin roof 108. The transmitted signal energy for the back seat volumes C-E is directed from the detector 104 to corresponding reflection points 110 on the cabin roof. In each case, the radar signal energy reflected from the occupant (if any) returns along the transmission path.

Figure 1B:
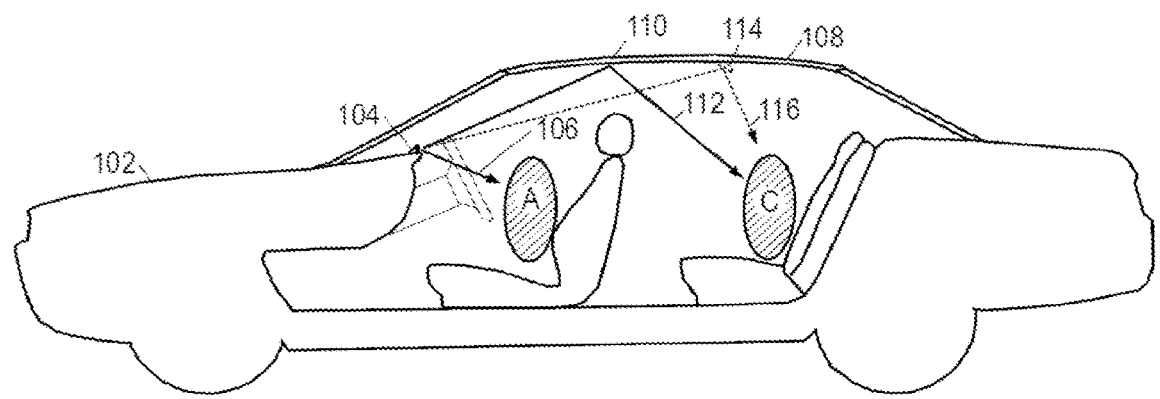
FIG. 1B is a cross section of an illustrative vehicle cabin with a centralized occupancy detection system.

FIG. 1B shows a side cross section of illustrative vehicle 102, with a front seat volume A and a back seat volume C. Centralized occupancy detector 104 can direct radar signal energy along direct, line-of-sight path 106 to volume A, and along a reflected path 112 from reflection point 110. Observe that added reflectors, such as reflector 114, can provide alternative reflected paths 116 if the geometry of the cabin roof 108 is unsatisfactory (e.g., due to the presence of a sunroof). The added reflector can take the form of an angled plane, but a convex surface (e.g., a semi-dome) may be preferred if an increased range of view is desired, or a concave surface (e.g., parabolic reflector) may be preferred for increased measurement separability and gain. The added reflectors can be attached to the cabin roof, or alternatively, the cabin roof may be shaped to provide the desired shapes to the reflection points. Where it is desired to minimize the profile of the surfaces for the reflection points, those surfaces may alternatively be formed or "shaped" using segmented surfaces such as Fresnel reflectors, or using reflection-type holographic optical elements.

Figure 2:
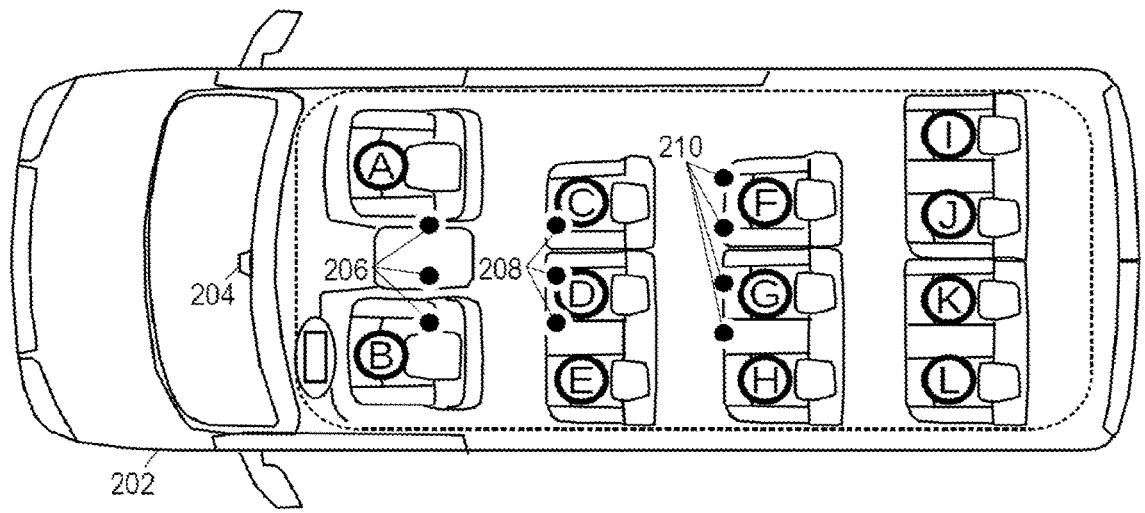
FIG. 2 is a cutaway top view of an illustrative vehicle cabin with a centralized occupancy detection system.

FIG. 2 shows a cutaway top view of a twelve passenger van 202, which like most vehicles designed to accommodate more than six passengers provides seating that is more upright than most cars and has a correspondingly higher cabin roof that may permit a dashboard-mounted occupancy detector 204 to monitor additional rows of seating. Reflection points 206 on the cabin roof may correspond to volumes C-E for the second row of seats. Roof reflection points 208 may correspond to volumes F-H for the third row of seats. Roof reflection points 210 may correspond to volumes I-L for the fourth row of seats. (Front row volumes A-B may be monitored via direct line of sight from the occupancy detector 204.) If the existing roof profile provides suboptimal positioning of the reflection points, added reflectors or surface shaping may be used to improve the reflection point positions.

Figure 3:
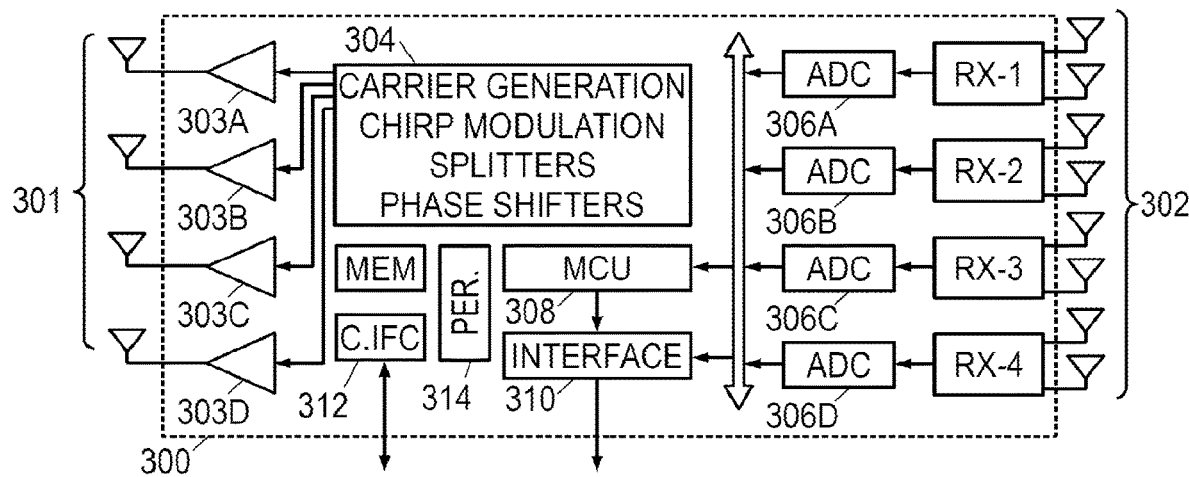
FIG. 3 is a block diagram of an illustrative centralized occupancy detector.

FIG. 3 shows an illustrative centralized occupancy detector, which includes a transceiver chip 300 coupled to an antenna array having four transmit elements 301 and eight receive elements 302. Power amplifiers 303A-303D drive the transmit antenna elements 301 with amplified signals from transmitter circuitry 304. Circuitry 304 generates a transmit signal within a programmable frequency band, using a programmable chirp rate and range. The transmit signal generator may employ a phase-locked loop (PLL) with suitable frequency multipliers. Splitters and phase shifters derive the transmit signals for the multiple power amplifiers 303A-303D to transmit concurrently with adjustable phase differences to enable beam steering, and further provide a reference "local oscillator" signal to the receivers for use in the down-conversion process. In the illustrated example, the transceiver chip 300 includes 4 transmitters, each of which is fixedly coupled to a corresponding transmit antenna element 301.

Chip 300 further includes 4 receivers (RX-1 through RX-4) each of which is selectably coupled to two of the receive antenna elements 302, providing a reconfigurable MIMO arrangement with 8 receive antenna elements, four of which can be employed concurrently to collect measurements. Four analog to digital converters (ADCs) 306A-306D sample and digitize the down-converted receive signals from the receivers RX-1 through RX-4, supplying the digitized signals to a microcontroller unit (MCU) 308 for filtering and processing, or directly to a high-bandwidth interface 310 to enable off-chip processing of the digitized baseband signals. If used, the MCU 308 generates image data that can be conveyed to an electronic control unit (ECU) or other host processor via the high-bandwidth interface 310.

A control interface 312 enables the ECU or other host processor to configure the operation of the transceiver chip 300, including the test and calibration peripheral circuits 314 and the transmit signal generation circuitry 304. As discussed further below, the MCU 308 may configure the transmitter circuitry 304 to drive the transmit antenna elements with relative phase differences that provide beam-steering of the transmitted signal energy, and may analyze the receive signals with various relative phase differences to provide enhanced directional sensitivity to the received signal energy.

An internal memory may hold a lookup table of azimuthal angles, elevation angles, and ranges, which are also expressible in terms of the desired relative phase differences and frequency offsets (or FFT bins, as described further below). The lookup table stores the parameter values associated with each of the stations to be monitored by the occupancy detector. The MCU 308 may iterate through the table, applying the relative phase differences and determining reflected energy amplitude at the specified range and direction for comparison with a predetermined threshold. The MCU 308 or external processor may determine that each station where the reflected energy amplitude exceeds the threshold is occupied.

Figure 4:
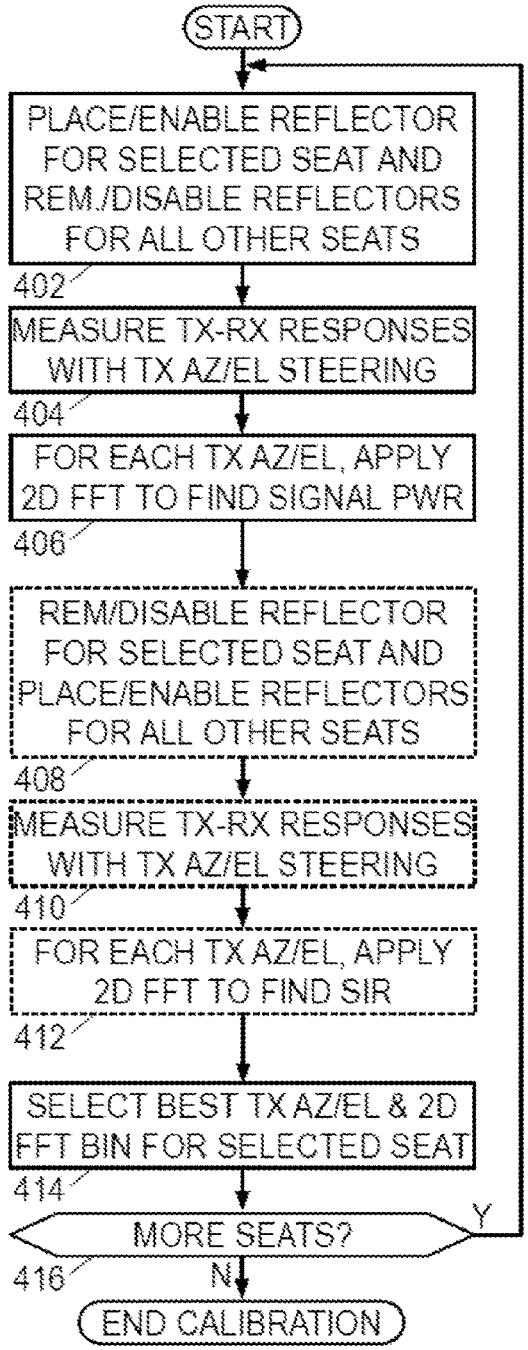
FIG. 4 is a flow diagram of an illustrative calibration method.

FIG. 4 is a flow diagram of an illustrative occupancy detector calibration method, which may be a one-time factory calibration to determine the appropriate parameter values to be stored in the internal (nonvolatile) memory. The illustrative method includes a series of blocks 402-416 that are performed for a first selected station in the vehicle and repeated for each subsequently selected station. In block 402, a reflector is placed in the detection volume for the first selected station and any reflectors in the detection volumes of other selected stations preferably removed. The reflector may be a passive reflector such as a corner reflector. If active reflectors are used, a reflector may be positioned in each detection volume, with only the reflector at the first selected station enabled and the rest being disabled.

In block 404, the occupancy detector steps through its full range of azimuth and elevation steering angles, transmitting radar signal energy and measuring the responses of each receive antenna element. The transmitted radar signals are preferably chirps, so that after downconversion the reflected signal energy is at a frequency offset corresponding to its travel time (and thus corresponding to the path distance or "range" of the reflector). In block 406, the occupancy detector performs a two dimensional frequency transform, such as a fast Fourier transform (FFT), for the response signals at each given azimuth and elevation steering angle. The 2D FFT converts the response signals into frequency coefficients representing reflected signal energy as a function of range and incidence angle. The frequency coefficients should exhibit a peak at a range and incidence angle corresponding to the selected station, and with the strength and location of the peak varying as a function of the transmit signal azimuth and elevation angles.

Figure 6:
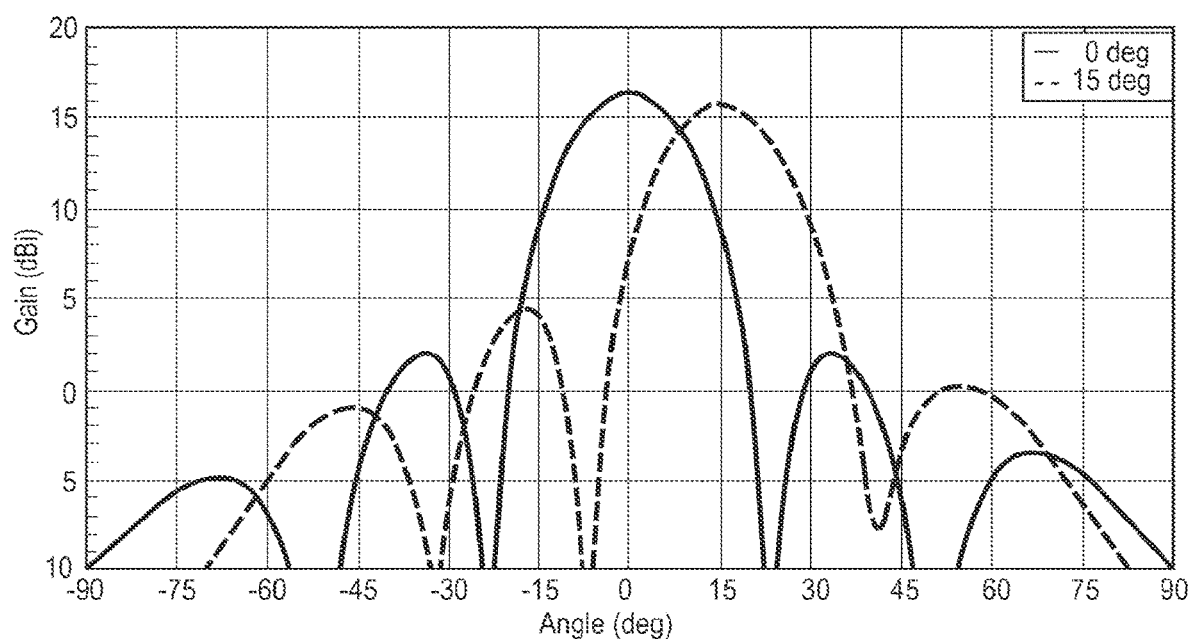
FIG. 6 is a graph of illustrative radiation patterns from a four-element phased antenna array.

In some implementations, the transmit signal azimuth and elevation angles that maximize the peak strength are chosen as the parameter values for the selected station in block 414, along with the FFT bin location (range, incidence angle) of the peak. While this approach may work well when using antenna arrays with narrow beamwidths (e.g., with larger numbers of antenna elements), it may be suboptimal for antenna arrays designed for lower-cost occupancy detectors. Antenna arrays with smaller numbers of antenna elements may have larger beam widths and more significant grating lobes. See, for example, FIG. 6 which shows radiation patterns for a four-element phased antenna array steered to zero degrees and to 15 degrees from the normal vector. Even when the main beam is steered to a selected station, other stations may receive (and their occupants may reflect) significant radar signal energy. To account for such potential interference, alternative calibration method implementations may include optional blocks 408-412 for measuring interference to enable determination of the signal-to-interference ratio.

In optional block 408, the reflector for the selected station is removed or disabled, and reflectors are provided or enabled for all other stations. In optional block 410, the occupancy detector again steps through the full range of azimuth and elevation steering angles, transmitting radar signal energy and measuring the responses of each receive antenna element. In optional block 412, the 2D FFT is performed for the response signals at each given transmit azimuth and elevation direction to obtain interference energy as a function of range and incidence angle. The magnitudes of the frequency coefficients from block 406 are each divided by the corresponding frequency coefficient magnitudes from block 412, producing a signal-to-interference ratio as a function of the parameter values. As before, the coefficient magnitudes should exhibit a peak at a range and incidence angle corresponding to the selected station, with the maximum value and location varying as a function of the transmit signal azimuth and elevation angles. The parameter values yielding the maximum signal-to-interference ratio can be chosen for the selected station in block 414.

In block 416, the method determines whether parameter values have been chosen for each of the stations, and if not, blocks 402-416 are repeated for the next selected station. Once parameter values have been determined for each station, the calibration method concludes with the storage of the parameter values in internal memory. In some implementations, the occupancy detection threshold is determined by positioning a standardized replica of occupants at one or more stations, measuring the reflected signal energy, and setting the threshold at a value that reliably distinguishes between the presence and absence of an occupant at each station.

Figure 5:
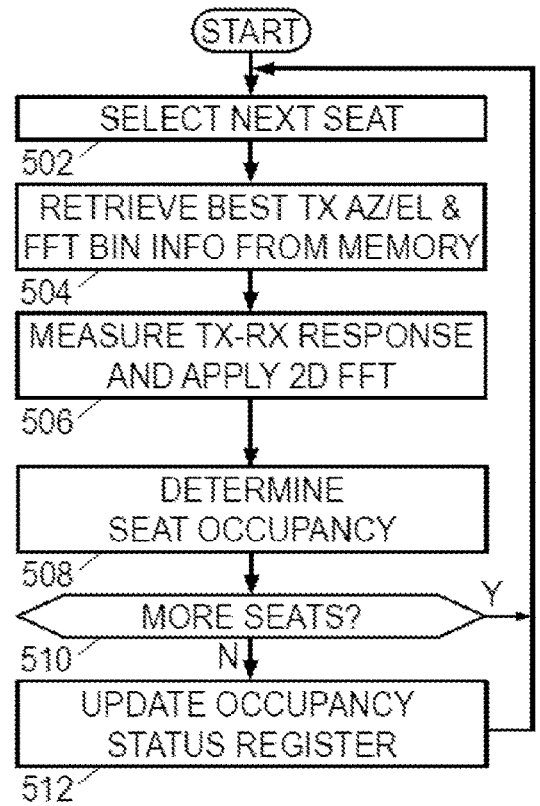
FIG. 5 is a flow diagram of an illustrative centralized occupancy detection method.

FIG. 5 is a flow diagram of an illustrative occupancy detection method that may be implemented by a centralized occupancy detector. The method includes a series of blocks that are performed for each of the multiple stations, and the method itself may be repeated in a periodic or in an event-triggered fashion to monitor station occupancy as it changes over time.

In block 502, the occupancy detector selects a first or next station. In block 504, the occupancy detector retrieves the parameter values for the selected station from memory. The parameter values may be those values chosen during the calibration process as the best transmit azimuth angle, transmit elevation angle, FFT range bin, and FFT incidence angle bin. In block 506, the occupancy detector uses the parameter values for transmitting a radar signal, obtaining the associated response signals, and processing the response signals to derive a reflected radar signal energy measurement. In block 508, the occupancy detector compares the reflected radar signal energy measurement to a predetermined threshold to determine whether the selected station is occupied.

In block 510, the occupancy detector checks to determine if a measurement has been obtained for each station, and if not, blocks 502-510 are repeated for the next selected station. Otherwise, in block 512 the occupancy detector updates a register indicating the occupancy status for each of the stations. In at least some implementations, the update process combines multiple measurements for each station to provide enhanced reliability.

Numerous other modifications, equivalents, and alternatives, will become apparent to those of ordinary skill in the art once the above disclosure is fully appreciated. For example, the illustrative methods are shown and described as if they occur in a sequential fashion, but those skilled in the art will recognize that many of the operations can be pipelined or otherwise performed in parallel, potentially with out-of-order operations and speculative execution where it is deemed desirable to trade off hardware complexity for faster execution.

As another example, the foregoing discussion describes occupant stations as seats in a vehicle, but the principles and techniques of this disclosure are also applicable to any enclosed or partially enclosed space having stations to accommodate occupants, including not only seats, but also designated areas for standing, kneeling, reclining, and for securing wheelchairs, gurneys, child seats, or other transport mechanisms. Though the drawings show a car and a passenger van, other suitable vehicles include shuttles, buses, trains, boats, private airplanes, commercial jets, space transports, submersibles, and elevators. For large vehicles having multiple seating sections, multiple centralized occupancy detectors may be employed, e.g., one for each section.

As yet another example, the drawings show the centralized occupancy detector as part of the vehicle dashboard, but it should be recognized that any position enabling separable measurements of the various stations can be used. As one contemplated variation, the centralized occupancy detector is positioned in a console between or just behind the front seats, acquiring each of its measurements via reflections from the cabin roof. It is intended that the following claims be interpreted to embrace all such modifications, equivalents, and alternatives where applicable.

What is claimed is:

1. A vehicle, comprising:
   at least one station configured to accommodate an occupant of the vehicle;
     a surface comprising a reflector configured to reflect radar signals; and
     a radar transceiver configured to detect an occupant of the at least one station based at least in part on the reflected radar signals and stored azimuth-elevation-range parameter values for at least the one station, wherein at least the one station is non-line of sight with the radar transceiver, and
     wherein the reflector corresponds to at least the one station.

2. The vehicle of claim 1, wherein the at least one station is one of multiple stations, and wherein the radar transceiver comprises an antenna array that is configured to obtain separable occupancy measurements of the multiple stations.

3. The vehicle of claim 2, wherein the radar transceiver is configured to detect an occupant of a second station of the multiple stations via line of sight.

4. The vehicle of claim 1, wherein the surface is formed by a roof of the vehicle.

5. The vehicle of claim 1, wherein the surface is coupled to a roof of the vehicle.

6. The vehicle of claim 1, wherein the radar transceiver is attached to or incorporated in a dashboard of the vehicle.

7. The vehicle of claim 6, wherein the at least one station is in a second row of seating in the vehicle.

8. The vehicle of claim 6, wherein the at least one station is in a third row of seating in the vehicle.

9. A vehicle comprising:
multiple stations each configured to accommodate an occupant of the vehicle; and
a radar transceiver configured to examine, via reflectors corresponding to the multiple stations, each of the multiple stations to determine whether that station has an occupant based at least in part on reflected radar signals and stored azimuth-elevation-range parameter values for the stations, wherein the multiple stations are non-line of sight with the radar transceiver, and
wherein a given reflector in the reflectors corresponds to a given station of the multiple stations.

10. The vehicle of claim 9, wherein the radar transceiver comprises an antenna array to obtain separable occupancy measurements of the multiple stations.

11. The vehicle of claim 10, wherein the vehicle further comprises a surface configured to reflect the radar signals, wherein the surface comprises the reflectors and wherein as part of examining at least one of the multiple stations the radar transceiver is configured to detect the radar signals.

12. The vehicle of claim 11, wherein as part of examining another station than the multiple stations the radar transceiver is configured to use direct line of sight.

13. The vehicle of claim 11, wherein the surface is part of a roof of the vehicle.

14. The vehicle of claim 11, wherein a dashboard of the vehicle comprises the radar transceiver.

15. The vehicle of claim 14, wherein at least one of the multiple stations is in a third row of seating in the vehicle.

16. A multi-station occupancy detector comprising:
an antenna array;
a radar transceiver coupled to the antenna array configured to provide transmit radar signals and to accept receive radar signals;
a memory having a set of azimuth-elevation-range parameter values for each of multiple stations configured to accommodate vehicle occupants; and
a controller configured to adjust relative phases of the transmit radar signals and analyze receive radar signals based at least in part on each set of azimuth-elevation-range parameter values, and to derive radar measurements indicating occupancy of each of the multiple stations based at least in part on the receive radar signals, wherein the multiple stations are non-line of sight with the radar transceiver, and
wherein the transmit radar signals and the receive radar signals are conveyed to a given station of the multiple stations via a corresponding reflector.

17. The multi-station occupancy detector of claim 16, wherein a given set of azimuth-elevation-range parameter values in the sets of azimuth-elevation-range parameter values correspond to signal transmission and reception paths that reflect radar signal from a surface comprising reflectors that are configured to reflect the transmit radar signals and the receive radar signals in a vehicle.

18. The multi-station occupancy detector of claim 17, wherein the surface is part of a roof of a vehicle when the antenna array is attached to or incorporated in a dashboard of the vehicle.

19. The multi-station occupancy detector of claim 18, wherein at least one of the sets of azimuth-elevation-range parameter values corresponds to a station in a third row of seating in the vehicle.

20. The multi-station occupancy detector of claim 16, wherein the memory has at least another set of azimuth-elevation-range parameter values for another station configured to accommodate another vehicle occupant, and the other station is direct line of sight with the antenna array;
wherein the controller is configured to adjust relative phases of the transmit radar signals and analyze receive radar signals based at least in part on at least the other set of azimuth-elevation-range parameter values, and to derive additional radar measurements indicating occupancy of the other station based at least in part on the receive radar signals; and
wherein at least the other set of azimuth-elevation-range parameter values correspond to a direct line-of-sight signal transmission and reception path.

* * * * *